United States Patent
Meis

(10) Patent No.: US 11,384,829 B2
(45) Date of Patent: Jul. 12, 2022

(54) PLANETARY TRANSMISSION, POWERTRAIN AND WIND TURBINE

(71) Applicant: Flender GmbH, Bocholt (DE)

(72) Inventor: Jean-Andre Meis, Duelmen (DE)

(73) Assignee: FLENDER GMBH, Bocholt (DE)

( * ) Notice: Subject to any disclaimer, the term of this patent is extended or adjusted under 35 U.S.C. 154(b) by 215 days.

(21) Appl. No.: 16/955,585

(22) PCT Filed: Dec. 10, 2018

(86) PCT No.: PCT/EP2018/084180
§ 371 (c)(1),
(2) Date: Jun. 18, 2020

(87) PCT Pub. No.: WO2019/121106
PCT Pub. Date: Jun. 27, 2019

(65) Prior Publication Data
US 2021/0079995 A1 Mar. 18, 2021

(30) Foreign Application Priority Data
Dec. 19, 2017 (EP) ..................................... 17208430

(51) Int. Cl.
*F16H 57/023* (2012.01)
*F03D 15/00* (2016.01)
(Continued)

(52) U.S. Cl.
CPC ........... *F16H 57/023* (2013.01); *F03D 15/00* (2016.05); *F16H 1/28* (2013.01); *F16H 57/025* (2013.01);
(Continued)

(58) Field of Classification Search
CPC ........ F16H 57/023; F16H 1/28; F16H 57/025; F16H 57/08; F16H 57/031; F03D 15/00;
(Continued)

(56) References Cited

U.S. PATENT DOCUMENTS 9,206,743 B2 * 12/2015 Schnetgoke .............. F02C 7/20
10,711,876 B1 * 7/2020 Bateman ................. F16H 57/04
(Continued)

FOREIGN PATENT DOCUMENTS

DE   10 2009 037 005 A1   2/2011
DE   10 2011 103 477 A1   3/2012
(Continued)

OTHER PUBLICATIONS

PCT International Search Report and Written Opinion of International Searching Authority dated Mar. 26, 2019 corresponding to PCT International Application No. PCT/EP2018/084180 filed Dec. 10, 2018.

*Primary Examiner* — Justin Holmes
(74) *Attorney, Agent, or Firm* — Henry M. Feiereisen LLC

(57) ABSTRACT

A planetary transmission includes a ring gear holder and a ring gear for accommodating at least one planetary gear. The ring gear holder can be connected to a housing component at its end face, and a plurality of recesses for accommodating fastening means are embodied at an end face of the ring gear holder. Accommodated in at least one of the recesses is a hollow element, in which a fastening screw is accommodated. The hollow element establishes a positive-fit engagement between the ring gear holder and the housing component.

13 Claims, 5 Drawing Sheets

(51) Int. Cl.
*F16H 57/08* (2006.01)
*F16H 1/28* (2006.01)
*F16H 57/025* (2012.01)

(52) U.S. Cl.
CPC .......... *F16H 57/08* (2013.01); *F05B 2240/21* (2013.01); *F05B 2240/50* (2013.01); *F05B 2240/60* (2013.01); *F05B 2260/40* (2013.01); *F05B 2260/40311* (2013.01)

(58) Field of Classification Search
CPC .............. F05B 2240/21; F05B 2240/50; F05B 2240/60; F05B 2260/40; F05B 2260/40311; Y02E 10/72
See application file for complete search history.

(56) References Cited

U.S. PATENT DOCUMENTS

2011/0298331 A1   12/2011   Kaiser et al.
2013/0172141 A1   7/2013   Dinter et al.

FOREIGN PATENT DOCUMENTS

| EP | 2 541 096 A1 | 1/2013 | |
|----|---|---|---|
| JP | S59 126165 A | 7/1984 | |
| WO | WO-2018105590 A1 * | 6/2018 | ............. F03D 17/00 |

* cited by examiner

PLANETARY TRANSMISSION, POWERTRAIN AND WIND TURBINE

CROSS-REFERENCES TO RELATED APPLICATIONS

This application is the U.S. National Stage of International Application No. PCT/EP2018/084180, filed Dec. 10, 2018, which designated the United States and has been published as International Publication No. WO 2019/121106 A1 and which claims the priority of European Patent Application, Serial No. 17208430.3, filed Dec. 19, 2017, pursuant to 35 U.S.C. 119(a)-(d).

BACKGROUND OF THE INVENTION

The invention relates to a planetary transmission, in which a ring gear is connected to a housing component. The invention equally relates to a drive train of a wind turbine, which is equipped with a corresponding planetary transmission. The invention also relates to a wind turbine which possesses a drive train of this kind.

A drive system of a wind turbine, which comprises a planetary transmission, is known from EP 2 541 096 A1. The planetary transmission comprises a ring gear, which is accommodated in a jacket-shaped housing section and is connected to an axial outer housing section. To this end, the ring gear is screwed on its end face to the axial outer housing section.

The publication DE 10 2011 103 477 A1 discloses an electric machine, which has a stator arrangement which possesses a stator ring, which in turn is connected to a machine housing. Arranged in a radial outer region of the machine housing and of the stator ring are bore holes, into which screws are received. Likewise received in the bore holes are hollow pins, through which the screws extend.

In transmission technology, the aim is to increase the mechanical power transferred by a transmission while keeping the unit size the same, or reducing it. At the same time, an effort is made to increase the service life of the transmission, to lower the maintenance outlay and to reduce the generation of noise during operation. Such improvements should be implemented in a simple, rapid and economical manner. These requirements are placed particularly on planetary transmissions which are used in wind turbines for example. There is demand for a planetary transmission which offers a technical improvement in at least one of the outlined points.

SUMMARY OF THE INVENTION

This object is achieved by the planetary transmission according to the invention. The planetary transmission comprises a ring gear holder, in which a ring gear is accommodated. Accommodated in the ring gear in a rotatable manner is at least one planetary gear, which is rotatably mounted on a planetary carrier and revolves during operation of the planetary transmission. The ring gear holder is connected to a housing component at its end face. To this end, a plurality of recesses suitable for accommodating fastening means are embodied at an end face of the ring gear holder. Corresponding to the recesses in the ring gear holder, recesses are also embodied in the housing component, which are suitable for accommodating the fastening means. By way of the fastening means, a releasable connection is established between the ring gear holder and the housing component in the assembled state. In accordance with the invention, a hollow element and a screw are accommodated as fastening means in at least one recess. The hollow element is embodied and arranged such that, in the assembled state, the screw is accommodated in the hollow element and extends through the hollow element. By way of the hollow element, a positive-fit engagement is established between the ring gear holder and the housing component, which prevents a relative displacement between the ring gear holder and the housing component. By means of the screw, in the assembled state a contact force is induced between the ring gear holder and the housing component, so that a friction force is induced in the region of contact between the ring gear holder and the housing component. The friction force also counteracts a relative displacement between the ring gear holder and the housing component and realizes a frictional engagement. In this context, a screw is also to be understood as meaning all kinds of technical equivalents, which are suitable for inducing a contact force between the housing component and the ring gear holder in a releasable manner by assembly, such as bolts or threaded bolts for example.

As a result of the screw extending through the hollow element according to the invention, a considerable space saving is achieved. In particular, a positive-fit engagement and a frictional engagement are substantially created at the same time at one point. This offers a high level of stability and allows the absorption of increased mechanical stress induced by the shaft power introduced into the planetary transmission. The space saved per recess allows an increased number of fastening means to be used on the end face of the ring gear holder and the housing component. This makes more efficient use of the tight installation space, in which recesses for fastening means are at all able to be embodied from a technically reasonable perspective. This overall makes it possible to use the planetary transmission for increased shaft powers while keeping the unit size the same. Likewise, the improved exploitation of the installation space due to recesses and fastening means being able to be positioned more closely together leads to the contact force which they generate being more evenly distributed. As a result, an improved sealing effect is induced between the ring gear holder and the housing component. By way of the invention, a more rigid interface is provided between the ring gear holder and the housing component, so that the relative movements between said parts are reduced. Consequently, deformations of the ring gear during operation are reduced, which in turn causes an improved supporting behavior of the toothing on the ring gear. As a result, higher certainty in a toothing between the ring gear and the at least one planetary gear engaging into the ring gear is also achieved from a structural perspective. As a result of relative movements occurring between the ring gear and the at least one planetary gear being reduced during operation, reduced wear occurs on teeth of the planetary gear and the ring gear. Furthermore, the generation of noise during operation of the planetary transmission is reduced by the invention.

In a preferred embodiment of the claimed planetary transmission, the at least one recess, in which the hollow element and the screw are accommodated as fastening means, is arranged in the region of a torque support of the planetary transmission. The torque support serves to mount the planetary transmission during operation and inter alia absorbs the mechanical stress caused by the present torque and the tare weight of the planetary transmission. In the region of the torque support, there is a change in rigidity and a correspondingly high mechanical stress of the housing component. This applies in particular, in relation to a main axis of rotation of the planetary transmission, in a region over which the torque support overlaps azimuthally by up to 20° on both sides. By way of the claimed solution, a particular improvement in the sealing effect is achieved in this region. Furthermore, due to increased shaft powers transferred by the transmission, the bearing reaction forces on the torque support are also increased. The outlined solution is advantageously suitable for withstanding the increased mechanical stress resulting therefrom in a reliable manner.

Moreover, the hollow element may be embodied as a hollow pin or as a tensioning sleeve. A hollow pin offers only a slightly reduced shear resilience with the same external dimensions as a cylindrical pin. One aspect of the claimed planetary transmission consists in the significant factor for the dimensioning of a hollow pin or cylindrical pin in the connection between the ring gear holder and the housing component mostly not being the maximum bearable shear force, but rather the surface pressure, as the housing material has considerably lower levels of strength than the pin. This produces the surprising result that the maximum bearable shear force of a hollow pin, which is reduced compared to a cylindrical pin, is irrelevant. Consequently, the described embodiment is based on the use of a seemingly weaker structural element, yet without reducing the overall load-bearing capacity of the connection between the ring gear holder and the housing component in the process. Moreover, a hollow pin offers an increased sealing effect, so that an escape of transmission oil through the recess is avoided for example. Using a tensioning sleeve as hollow element offers the same advantages as a hollow pin. In addition, the tensioning sleeve can be compressed, which allows a simpler assembly. Furthermore, due to the reset force of the tensioning sleeve, a self-centering is achieved and thus the assembly outlay is reduced further and an improved sealing effect is achieved. Moreover, tensioning sleeves and hollow pins can be mixed in the claimed planetary transmission, i.e. each used in different recesses.

In a further embodiment of the claimed planetary transmission, the ring gear is accommodated in the ring gear holder in a non-rotating manner. As a result, rotating relative movements between the ring gear and the ring gear holder are reduced to a minimum and the stress introduced into the ring gear holder is introduced into the ring gear. In a further embodiment, the ring gear and the ring gear holder may also be embodied in one piece, i.e. integrally. In a ring gear holder which is embodied in one piece with the ring gear, the width of the end face of the ring gear holder substantially corresponds to the present material thickness radially outside a tooth base of a ring gear toothing. Due to the efficient use of the installation space according to the invention, the connection between the ring gear holder and the housing component can be designed in a single row. Consequently, it is unnecessary to provide a plurality of recesses spaced apart radially, i.e. to provide two circles of holes. Accordingly, the material thickness of the ring gear holder can be kept to a minimum while the load carrying capacity of the connection between the ring gear holder and the housing component remains the same, or even is increased. Ring gears are typically made of a hardened material, which requires an expensive processing. Overall, the claimed solution offers an increased mechanical load-bearing capacity with a reduced manufacturing outlay.

Furthermore, in the claimed planetary transmission, the recess in the ring gear holder, in which a hollow element and a screw are accommodated as fastening means, may be embodied as a bore hole. In this context, the bore hole may have a first and a second bore hole diameter. In addition or as an alternative, a recess in the housing component may be embodied as a bore hole with a first and a second bore hole diameter. In this context, the first bore hole diameter is lower than the second bore hole diameter. The screw is accommodated in the region of the first bore hole diameter and may be at least partially provided with an internal thread. The hollow element which establishes the positive-fit engagement between the ring gear holder and the housing component is accommodated in the region of the second bore hole diameter. Particularly preferably, a stepped transition is present between the region with the first bore hole diameter and the region with the second bore hole diameter. A stepped transition can be manufactured in a simple manner by two separate boring procedures. Furthermore, a conical transition between the regions with the first and second bore hole diameters offers an improved flow of force and avoids jumps in rigidity. As a result, a conical transition is mechanically more resilient, which allows for a further augmentation of the occurring forces, and thus of the shaft power transferred by the planetary transmission.

In a further preferred embodiment of the planetary transmission, the end face of the ring gear holder has a radial width which corresponds to 1.5 to 5.0 times to the first or second bore hole diameter. The use of the hollow element and the screw in a recess as fastening means thus allows the ring gear holder to be manufactured in a particularly space-saving and material-saving manner. In a ring gear holder which is embodied in one piece with the ring gear, the radial width is to be understood as meaning the radial dimension from an outer surface of the ring gear holder to the tooth base of the ring gear toothing. Consequently, the described solution can be realized in a particularly economical manner. Alternatively, the end face of the ring gear holder may have a radial width which corresponds to 3.0 to 8.0 times the modulus of the toothing on the ring gear or on the planetary gear engaging therein.

Moreover, a coating which increases the coefficient of friction may be arranged between the end face of the ring gear and the housing component. In this context, the coating which increases the coefficient of friction may be embodied as a washer, plate, membrane or film. Such coatings which increase the coefficient of friction are substantially embodied as metallic films, which are coated with a matrix in which hard particles, for example diamonds, are arranged. By way of a coating which increases the coefficient of friction, as outlined in the preceding examples, the friction force counteracting a relative movement of the ring gear holder and the housing component is increased. As a result of a more even distribution of the contact force on the end face of the ring gear holder being achieved via hollow elements and screws accommodated therein, at said positions regions are minimized or avoided, where a required minimum contact force for the coating which increases the coefficient of friction is not met. Consequently, the claimed solution allows the effective use of coatings which increase the coefficient of friction in the form of washers, plates, membranes and films in a larger region on the end face of the ring gear holder. Overall, it is possible to further exploit the technical potential of such coatings which increase the coefficient of friction in the claimed planetary transmission. Thus, the technical advantages of the claimed solution outlined above are further augmented overall.

Alternatively, the coating which increases the coefficient of friction may also be embodied as a microstructure, which offers a local increase in the coefficient of friction due to its geometry. Microstructures offer minimal dimensions and can be embodied differently according to demand. For example, such microstructures may ensure a direction-dependent increase in the coefficient of friction. Furthermore, in the claimed planetary transmission, it is also possible to use a combination of a plurality of coatings which increase the coefficient of friction of the types described previously.

Furthermore, the coating which increases the coefficient of friction may be embodied as a ring, as a ring segment, as a perforated tape or as a circular arc segment. A coating which increases the coefficient of friction embodied as a ring or ring segment may be attached directly around a recess in a simple manner and thus a maximum increase in the coefficient of friction can be achieved locally. A perforated tape or circular arc segment as a coating which increases the coefficient of friction allows an assembly on the end face which covers a wide area in a rapid and simple manner. Shaping the coating which increases the coefficient of friction in this manner makes it possible to further exploit its technical potential.

In a further preferred embodiment of the claimed planetary transmission, the fastening means, i.e. the hollow element and the screw, are selected such that in the assembled state the Rötscher cones of fastening means, in particular screws, in adjacent recesses at least partially overlap. An even and high contact force is achieved thereby. It is further preferable for the screws and the hollow element to be embodied such that the hollow element is at least partially, preferably completely enclosed by the Rötscher cone of the screw. This avoids a mutual mechanical obstruction between screw and hollow element and achieves an increased stability. This takes place by way of a suitable choice of the axial lengths of the screw and of the hollow element.

Moreover, the hollow element which establishes a positive-fit engagement between the transmission component and the ring gear holder may be made of a metallic material. The metallic material in particular may be a steel, a steel alloy, a nickel-based alloy or a titanium alloy. Such materials offer a high level of stability for the positive-fit engagement established. At the same time, metallic materials offer a sufficient elasticity, so that the hollow element can be embodied as a tensioning sleeve in a particularly advantageous manner. Furthermore, metallic materials can be processed in a precise and economical manner, so that corresponding hollow elements can be manufactured in a cost-efficient manner.

The object described is also achieved by a drive train for a wind turbine, which comprises a rotor shaft, via which the shaft power of a rotor is supplied to a planetary transmission. To this end, the rotor shaft is connected to the planetary transmission in a torque-transferring manner. The planetary transmission in turn is connected to a generator in a torque-transferring manner. In the assembled state, the drive train is arranged in a nacelle of a wind turbine. According to the invention, the planetary transmission of the drive train is embodied in accordance with one of the embodiments of the claimed planetary transmission outlined above.

Equally, the object is achieved by a wind turbine, which has a rotor which is connected to a rotor shaft via a rotor bearing. In this context, the rotor shaft belongs to a drive train, which is embodied in accordance with the embodied described above and is equipped with an embodiment of the planetary transmission according to the invention.

BRIEF DESCRIPTION OF THE DRAWING

The invention is described below on the basis of figures of individual embodiments. In this context, the features of the figures and the description above are to be read such that they supplement one another and can be readily combined with one another, in which, in detail.

DETAILED DESCRIPTION OF PREFERRED EMBODIMENTS

Figure 1:
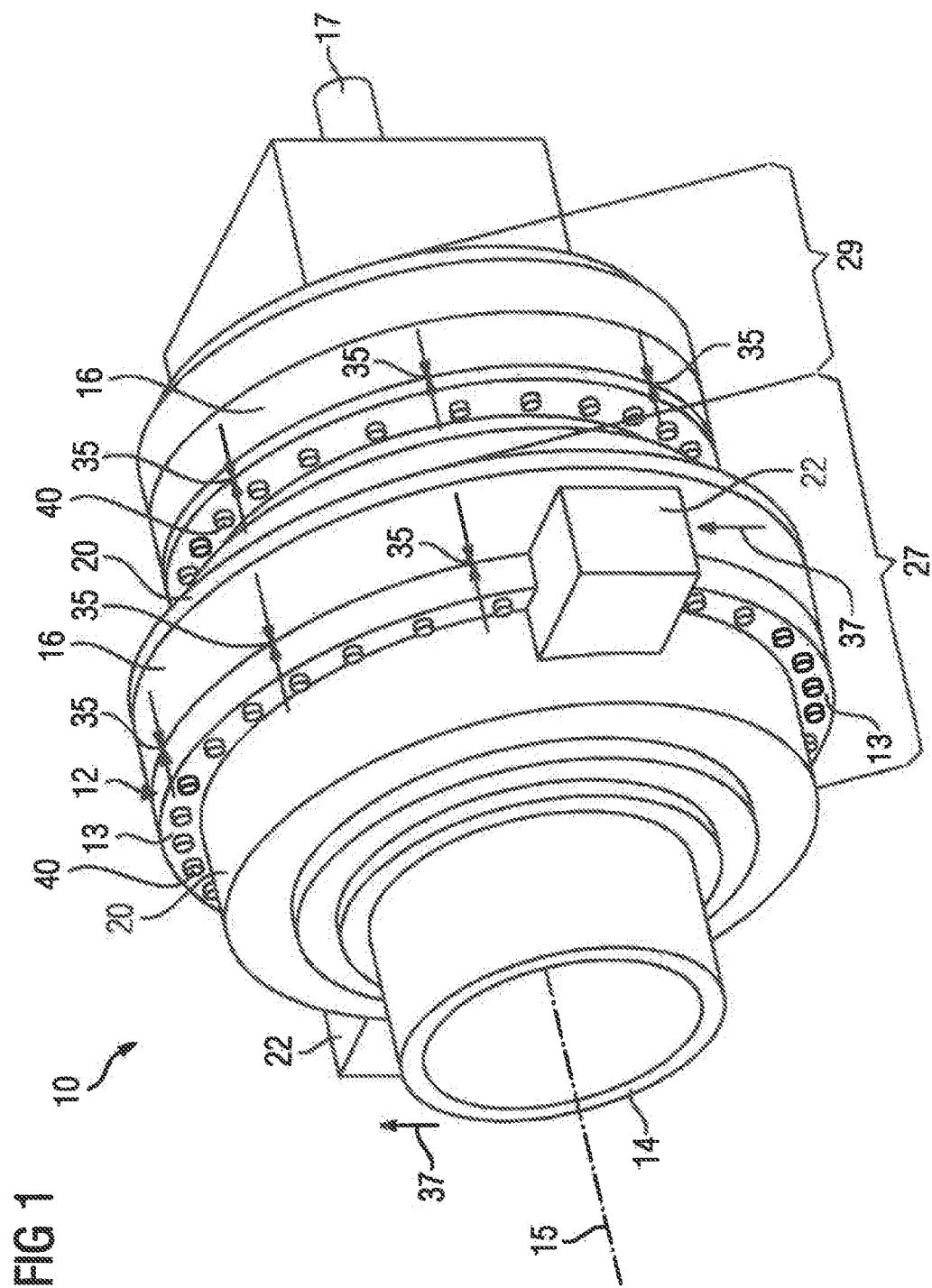
FIG. 1 shows an oblique view of a first embodiment of the planetary transmission according to the invention.

FIG. 1 schematically shows an oblique view of a first embodiment of the planetary transmission 10 according to the invention. The planetary transmission 10 has an input shaft 14, which can be rotated about a main axis of rotation 15. The input shaft 14 is embodied as a rotor shaft and can be connected to a rotor 72 (not shown in further detail). During operation, a torque is introduced into the planetary transmission 10 via the input shaft 14. The planetary transmission 10 further possesses an output shaft 17, at which it is possible to connect to a generator 74 (not shown in further detail). The planetary transmission 10 has a housing 12, which comprises a plurality of housing components 20. Arranged in the planetary transmission 10 are a first and a second planetary stage 27, 29. A ring gear holder 16 belongs to each of the two planetary stages 27, 29. Accommodated in each of the ring gear holders 16 is a ring gear 18. Attached to the ring gear holder 16 of the first planetary stage 27 is a housing component 20, which has a plurality of recesses 24 in a radial edge region 13. An end face 30 of the ring gear holder 16 abuts an end face 32 of the housing component 20. Arranged in the recesses 24 are fastening means 40, 42, which ensure a stable and releasable connection between the ring gear holder and the housing component 20. The fastening means 40, 42 are embodied as screws 40 and hollow elements 42, wherein a hollow element 42 is accommodated in each recess 24.

A screw 40 extends through each hollow element 42. Each hollow element 42 creates a positive-fit engagement between the housing component 20 and the ring gear holder 16. At the same time, a contact force 36 at the end faces 30, 32 is induced between the ring gear holder 16 and the housing component 20 by the screws 40. As a result of the contact force 35, a friction force is created between the ring gear holder 16 and the housing component 20, which prevents a relative movement between the housing component and the ring gear holder 16. Attached to the housing component 20 at the first planetary stage 27 are two torque supports 22, which serve to suspend the planetary transmission 10. The torque supports 22 absorb inter alia the bearing reaction forces 37 caused by the tare weight of the planetary transmission 10.

Figure 2:
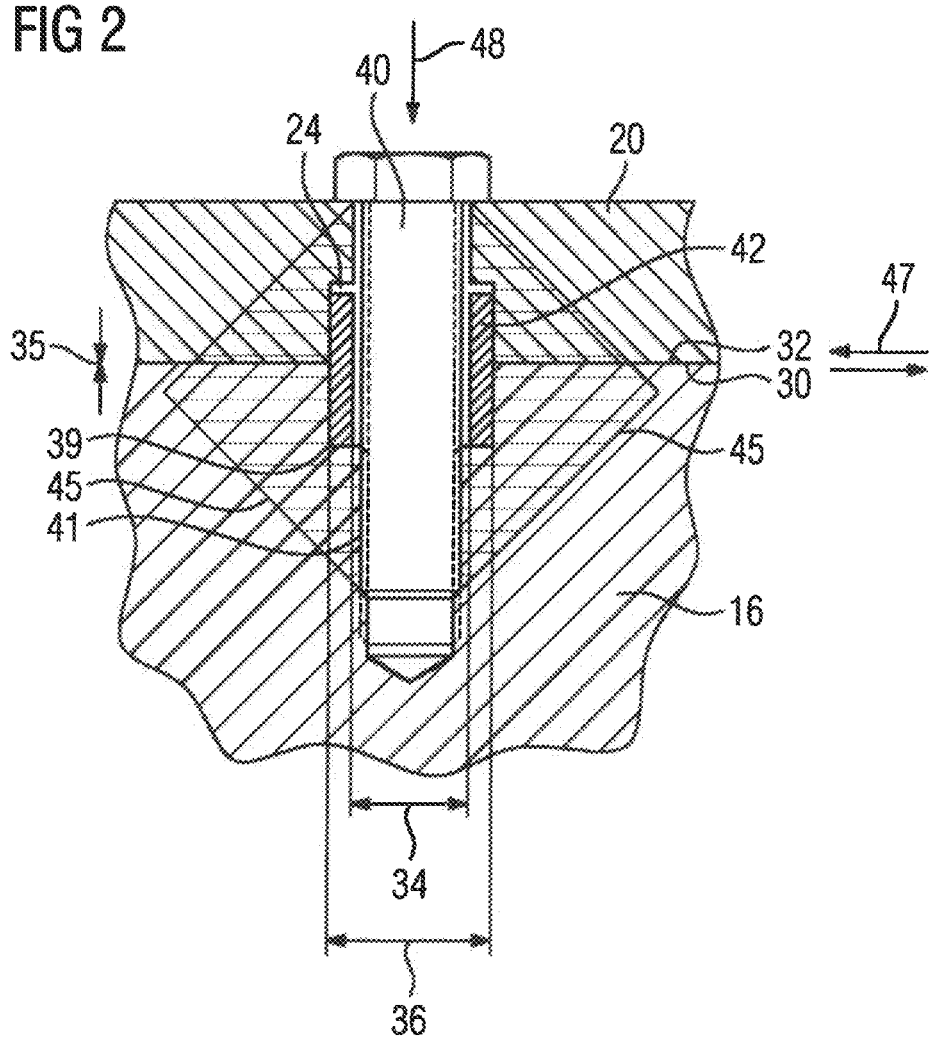
FIG. 2 shows a longitudinal section of a detail view of the first embodiment of the planetary transmission according to the invention.

FIG. 2 shows a schematic sectional representation of a detail view of the embodiment in accordance with FIG. 1. The same reference characters have the same meanings in FIG. 1 and FIG. 2. A connection is depicted between the first housing component 20 and the ring gear holder 16, which comprises a screw 40 which extends through a hollow element 42 embodied as a hollow pin. The screw 40 engages at one end into an internal thread 41, which is embodied in the recess 24 in the ring gear holder 16. The recess 24 is embodied as a bore hole in the ring gear holder 16 and in the housing component 20. The recess 24 in the ring gear holder 16 has a region with a first bole hole diameter 34, in which the internal thread 41 is also embodied. In the ring gear holder 16, the hollow element 42 is positioned in a region of the recess 24 in which the recess 24 has a second bore hole diameter 36, which is greater than the first bore hole diameter 34. Embodied between the region with the first and the second bore hole diameter 34, 36 is a stepped transition 39. Regions with a first and second bore hole diameter 34, 36 are embodied accordingly in the housing component 20. The hollow element 42 is also accommodated in the recess 24 in the housing component 20 and thus ensures a positive-fit engagement with the ring gear holder 16 and the housing component 20. Furthermore, a contact force 35 is exerted by the screw 40 in the assembled state, by way of which the housing component 20 and the ring gear holder 16 are pressed against one another at their end faces 30, 32. The contact force 35 thus induces a friction force, which acts in the plane of the end faces 30, 32 and therefore realizes a non-positive-fit engagement. The interaction of the positive-fit engagement due to the hollow element 42 and the non-positive-fit engagement due to the screw 40 prevents a relative movement 47 between the ring gear holder 16 and the housing component 20. The recess 24 therefore only requires space for one fastening means 40, 42, namely for the hollow element 42, but accommodates two fastening means 40, 42. The screw 30 and the hollow element 42 are embodied and positioned such that the hollow element 42 is completely enclosed by the Rötscher cone 45 of the screw 40. The hollow element 42 is further embodied such that a clearance fit is present along an assembly direction 48 in the assembled state. This ensures that the hollow element 42 does not obstruct the non-positive connection formed by the screw 40.

Figure 3:
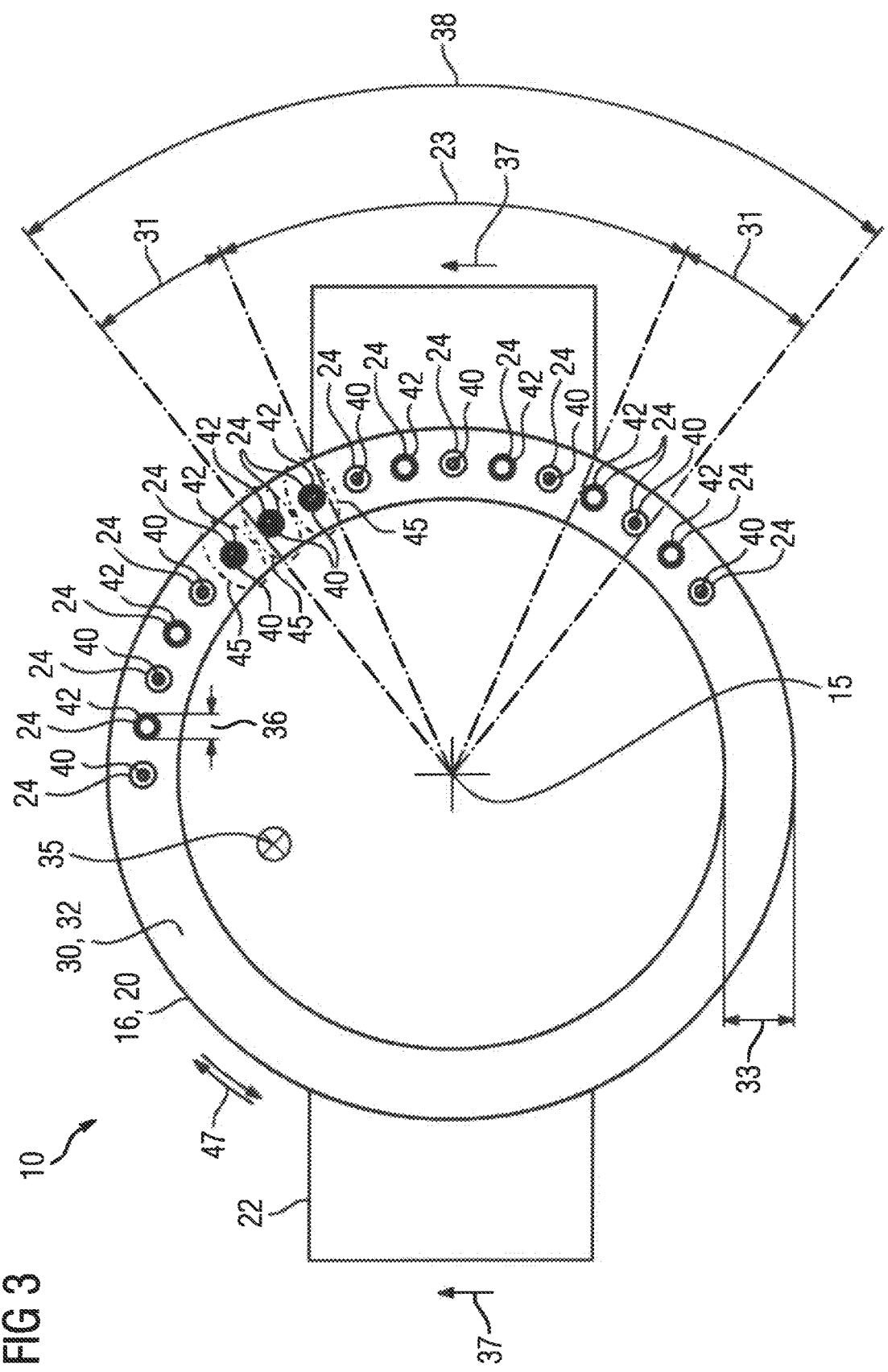
FIG. 3 shows a cross-section of a second embodiment of the planetary transmission according to the invention.

FIG. 3 schematically shows a cross-section of a second embodiment of the planetary transmission 10 according to the invention. The representation in FIG. 3 is a cross-section in a contact plane between the end face 32 of the housing component 20 and the end face 30 of the ring gear holder 16 (not shown in further detail) which abuts it. The same reference characters have the same meanings in FIG. 1, FIG. 2 and FIG. 3. The housing component 20 has recesses 24, in which fastening means 40, 42 are accommodated and are arranged substantially in the center on the end face 32. Molded onto the housing component 20 are torque supports 22, which are suitable for absorbing the bearing reaction forces 37 caused by the torque introduced via the input shaft 14 during operation and/or by the tare weight of the planetary transmission 10. The torque supports 22 each define the position of a support region 23, in which the torque supports 22 are positioned. The transition region 23 is defined by an angle in relation to the main axis of rotation 15 of the planetary transmission 10. Joining the support region 23 on both sides is a transition region 31, in which, as in the support region 23, increased mechanical stress occurs during operation. The support region 23 and the adjacent transition regions 31 form a continuous combination region 38. In the combination region 38, a hollow element 42 and a screw 40 are accommodated in recesses 24. In this context, the screw 40 extends through the hollow element 42, as shown in FIG. 2 for example. Such an arrangement of fastening means 40, 42 offers a high level of stability against a relative movement 47 of the housing component 20 in relation to the ring gear holder 16 (not shown hi further detail). The hollow elements 42 accommodated in the recesses 24 further offer an increased sealing effect, and thus prevent the escape of transmission oil from the planetary transmission 10. Furthermore, the end face 32 of the housing component 20 has a radial width 33, which substantially corresponds to 1.5 to 5.0 times a second bore hole diameter 36, which substantially corresponds to a diameter of the hollow element 42. The end face 32 therefore has a reduced radial width 33 and at the same time offers a high level of stability against relative movements 47 between the housing component 20 and the ring gear holder 16. The screws 40, which are accommodated in the hollow elements 42, embody Rötscher cones 44, the projections of which are represented in FIG. 3. The Rötscher cones 45 of screws 40, which are accommodated in adjacent hollow elements 42, partially overlap. There is thus an even distribution of a contact force 35 (not depicted in further detail) between the housing component 20 and the ring gear holder 16, whereby the sealing effect of the connection is augmented further.

Figure 4:
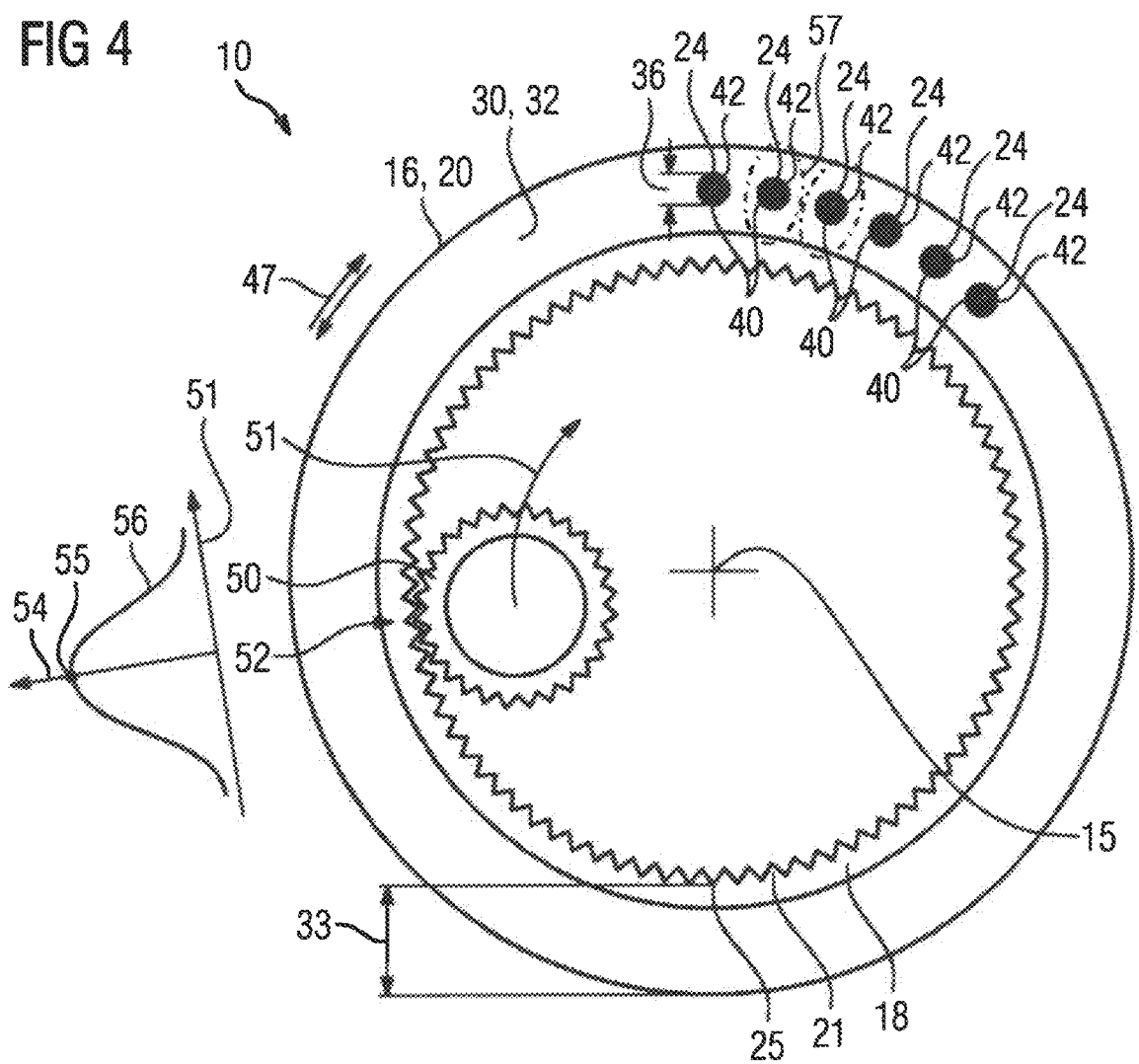
FIG. 4 shows a further cross-section of the second embodiment of the planetary transmission according to the invention.

FIG. 4 schematically shows a further cross-section of the second embodiment of the planetary transmission 10 according to the invention. The representation in FIG. 3 is a cross-section in a contact plane between the end face 32 of the housing component 20 (not shown in further detail) and the end face 30 of the ring gear holder 16 which abuts it. FIG. 3 and FIG. 4 thus schematically represent mutually adjacent cross-sections of the planetary transmission 10. FIG. 3 and FIG. 4 should be understood such that they supplement one another. The same reference characters therefore have the same technical meaning in FIGS. 1, 2, 3 and 4. Arranged in the ring gear holder 16 is a ring gear 18, which is embodied in one piece with the ring gear holder. The ring gear 18 has a circumferential ring gear toothing 21, which can be made of a hardened material. A planetary gear 50 shown schematically engages into the ring gear toothing 21, wherein a mechanical stress 56 is induced in a contact region 52 in the region of a tooth base 25. The mechanical stress 56 is depicted schematically on a size axis 54. In the contact region 52, the mechanical stress 56 further has a load distribution 56 with a maximum stress 55. During operation of the planetary transmission 10, the planetary gear 50 moves in a peripheral direction 51, so that the maximum stress 55 follows the planetary gear 50. The revolving of the maximum stress 55 represents a cylindrical stressing of the ring gear 18 and the ring gear holder 16. Corresponding to the recesses 24 in the housing component 20, in FIG. 3, recesses 24 are embodied on the end face 30 of the ring gear holder 16. Also accommodated in the recesses 24 in the ring gear holder 16 are the fastening means 40, 42, which are attached in the housing component 20. The hollow elements 42 and the screws 40, due to their dimensioning, are embodied so as to withstand a static load 57 cylindrically overlaid by the revolving maximum stress 55 during operation. In this context, the connections with the hollow elements 42 and the screws 40 are capable of sustained operation. A relative movement 47 between the ring gear holder 16 and the housing component 20 is thus counteracted on a long-term basis. The radial width 33 of the ring gear holder 16 with the ring gear 18 amounts to between 1.5 and 5.0 times a second bore hole diameter 36, which corresponds to the diameter of a hollow element 42. The radial width 33 is defined by the distance from an outer surface of the ring gear holder to the tooth base 25 of the ring gear 18.

Figure 5:
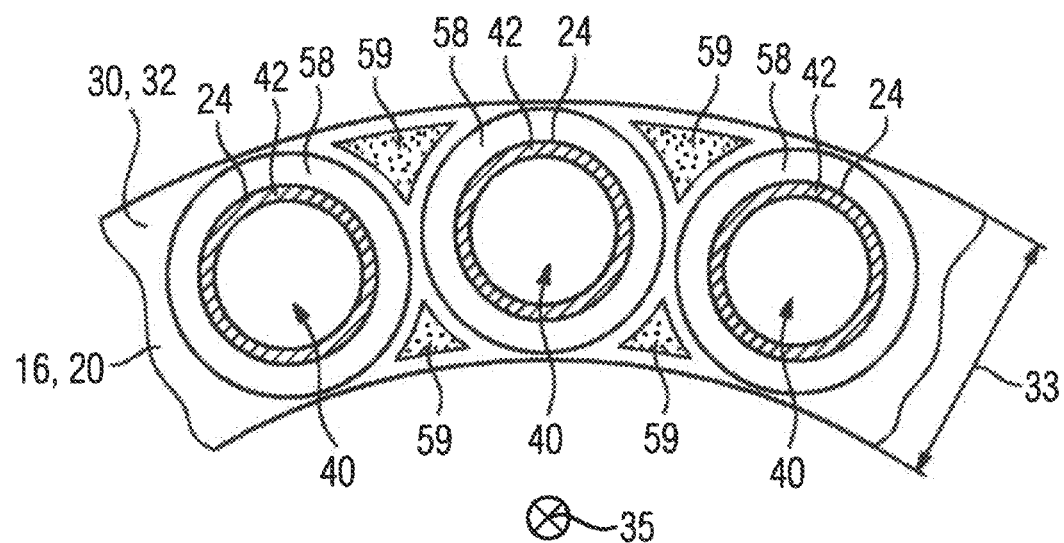
FIG. 5 shows a detail view of a third embodiment of the invention.

FIG. 5 shows a detail view of a third embodiment of the invention. Embodied on an end face 30, 32 of a ring gear holder 18 or a housing component 20 are recesses 24, in which hollow elements 42 are accommodated and which are suitable for accommodating screws 40 (not shown in further detail). The recesses 24 are each surrounded by a coating 58 which increases the coefficient of friction, embodied as annular washers. These substantially extend over the entire radial width 33 and thus ensure an increased friction force in the plane of the end face 30, 32. As a result of hollow elements 42 and screws 40 simultaneously being accommodated as fastening means 40, 42 in the recesses 24, an even distribution of a contact force 35 is ensured. By contrast, solutions known from the prior art, in which solid pins are used instead of hollow elements 42, do not offer sufficient minimum pressure which is required for a reliable use of coatings 58 which increase the coefficient of friction. The advantageous effect of the hollow elements 42 is thus further augmented by the washers with the coating 58 which increases the coefficient of friction. In addition, the surface of the end face 30, 32 is provided with microstructures 59, which also serve as a coating which increases the coefficient of friction. The microstructures 59 can be manufactured by means of laser processing or machining. The mechanical properties of the microstructures 59 can be adapted by a corresponding embodiment of the manufacturing process. For example, a direction-dependent increase in the coefficient of friction is possible.

Figure 6:
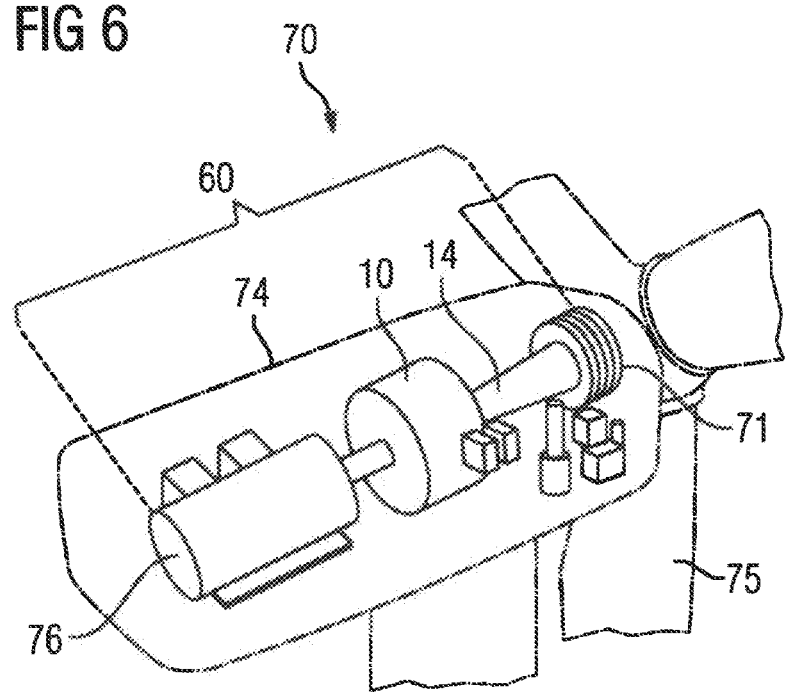
FIG. 6 shows a sectional oblique view of a wind turbine according to the invention.

FIG. 6 shows, in a sectional oblique view, an embodiment of a wind turbine 70 according to the invention. The wind turbine 70 has a rotor 75, which is connected to a rotor shaft 14 via a rotor bearing 71. The rotor shaft 14 serves as an input shaft for a planetary transmission 10.

The planetary transmission 10 in turn is mechanically connected to a generator 76. The rotor bearing 71, the rotor shaft 14, the planetary transmission 10 and the generator 76 belong to a drive train 60, which is arranged in a nacelle 70 of the wind turbine 70. In this context, the planetary transmission 10 is embodied in accordance with an embodiment of the invention.

What is claimed is:

1. A planetary transmission, comprising:
   a housing component;
   a ring gear holder configured for connection to the housing component, with the ring gear holder and the housing component having abutting end faces formed with aligned recesses;
   a ring gear received in the rear gear holder for interacting with at least one planetary gear;
   a hollow element accommodated in at least one of the recesses to establish a positive-fit engagement between the ring gear holder and the housing component, said at least one of the recesses being embodied as a bore hole defined by a first bore hole diameter and a second bore hole diameter;
   a fastening screw received in the hollow element; and
   a torque support attached to the housing component, with the at least one of the recesses, with the hollow element accommodated therein and the fastening screw, being arranged in a region of the torque support.

2. The planetary transmission of claim 1, wherein the hollow element is embodied as a hollow pin or as a tensioning sleeve.

3. The planetary transmission of claim 1, wherein the ring gear is accommodated in the ring gear holder in a non-rotating manner or is embodied in one piece with the ring gear holder.

4. The planetary transmission of claim 1, wherein a stepped or a conical transition is embodied between a first region with the first bore hole diameter and a second region with the second bore hole diameter.

5. The planetary transmission of claim 1, wherein the end face of the ring gear holder has a radial width which corresponds to 1.5 to 5.0 times the first bore hole diameter or second bore hole diameter, or corresponds to 3.0 to 8.0 times a modulus of a toothing on the planetary gear and/or the ring gear.

6. The planetary transmission of claim 1, further comprising a coating arranged in the form of a washer, plate, membrane, film or as a microstructure between the end face of the ring gear holder and the housing component to increase a coefficient of friction.

7. The planetary transmission of claim 1, further comprising a coating embodied as a ring, as a ring segment, as a perforated tape or as a circular arc segment between the end face of the ring gear holder and the housing component to increase a coefficient of friction.

8. The planetary transmission of claim 1, wherein in an assembled state, Rötscher cones of fasteners in two adjacent ones of the recesses partially mutually overlap.

9. The planetary transmission of claim 1, wherein the hollow element and the fastening screw are embodied such that, in an assembled state, the hollow element is at least partially enclosed by a Rötscher cone of the fastening screw.

10. The planetary transmission of claim 1, wherein the hollow element and the fastening screw are embodied such that, in an assembled state, the hollow element is completely enclosed by a Rötscher cone of the fastening screw.

11. The planetary transmission of claim 1, wherein the hollow element is made of a metallic material.

12. A drive train for a wind turbine, said drive train comprising:
    a generator;
    a planetary transmission connected in a torque-transferring manner to the generator and comprising a housing component, a ring gear holder configured for connection to the housing component, with the ring gear holder and the housing component having abutting end faces formed with aligned recesses, a ring gear received in the rear gear holder for interacting with at least one planetary gear, a hollow element accommodated in at least one of the recesses to establish a positive-fit engagement between the ring gear holder and the housing component, said at least one of the recesses being embodied as a bore hole defined by a first bore hole diameter and a second bore hole diameter, a fastening screw received in the hollow element, and a torque support attached to the housing component, with the at least one recess, with the hollow element accommodated therein and the fastening screw, being arranged in a region of the torque support; and
    a rotor shaft connected in a torque-transferring manner to the planetary transmission.

13. A wind turbine, comprising:
    a drive train as set forth in claim 11 and including a rotor shaft; and
    a rotor connected to the rotor shaft of the drive train via a rotor bearing.

* * * * *